Oct. 4, 1938.　　A. M. DRAKE ET AL　　2,131,939
PRODUCTION TAP GRINDER
Filed Aug. 1, 1936　　5 Sheets-Sheet 1
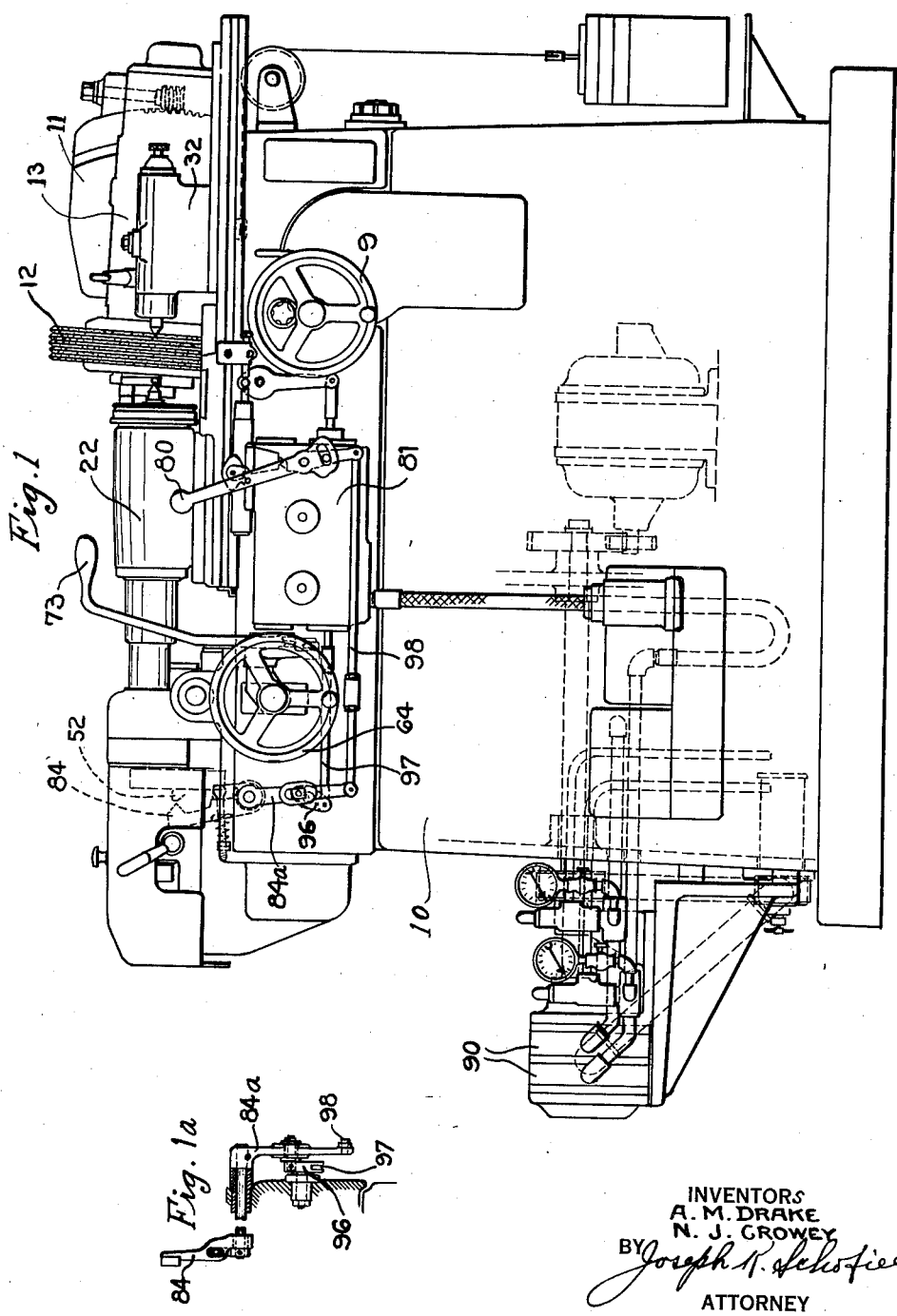
INVENTORS
A. M. DRAKE
N. J. CROWEY
BY Joseph R. Schofield
ATTORNEY

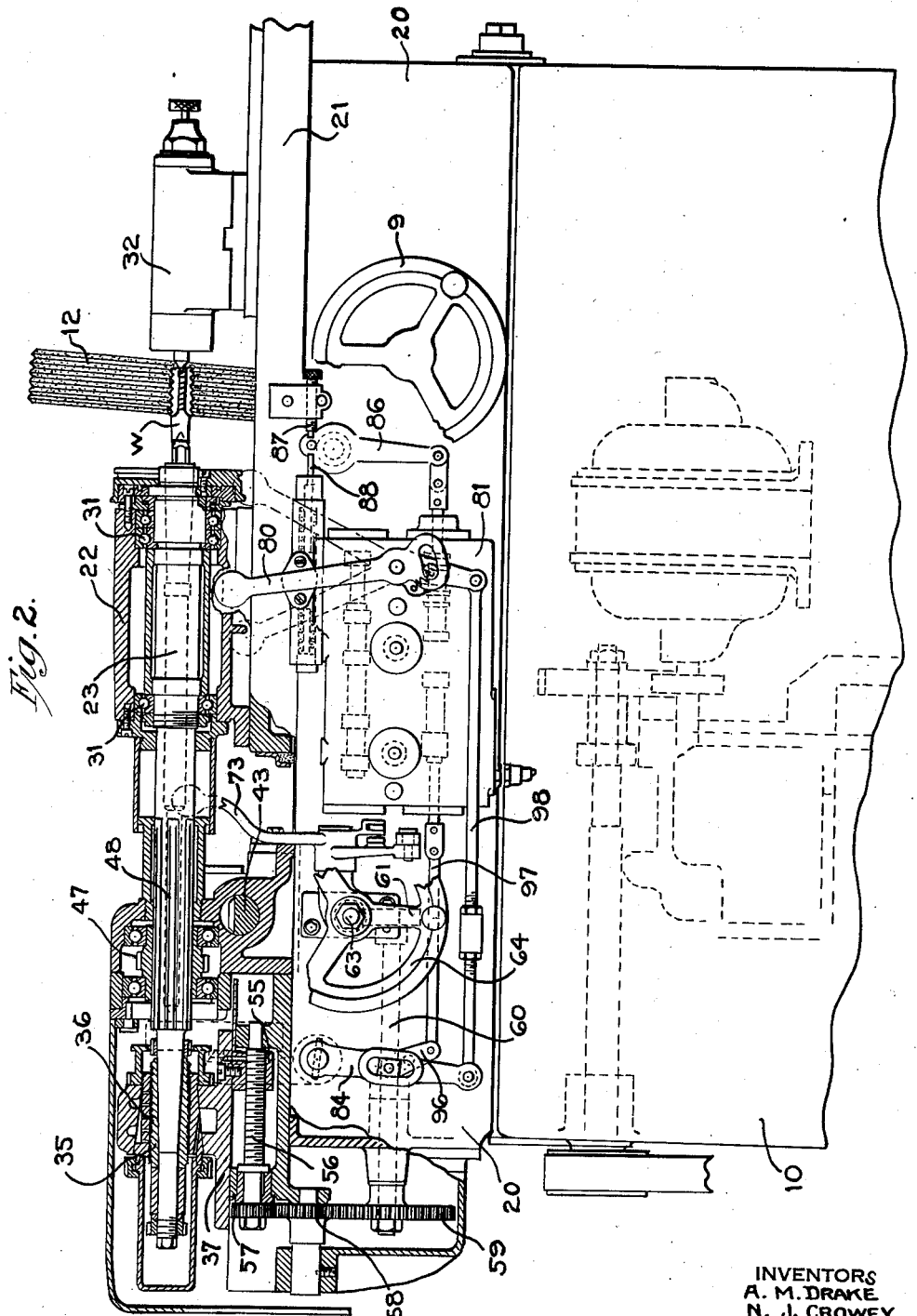

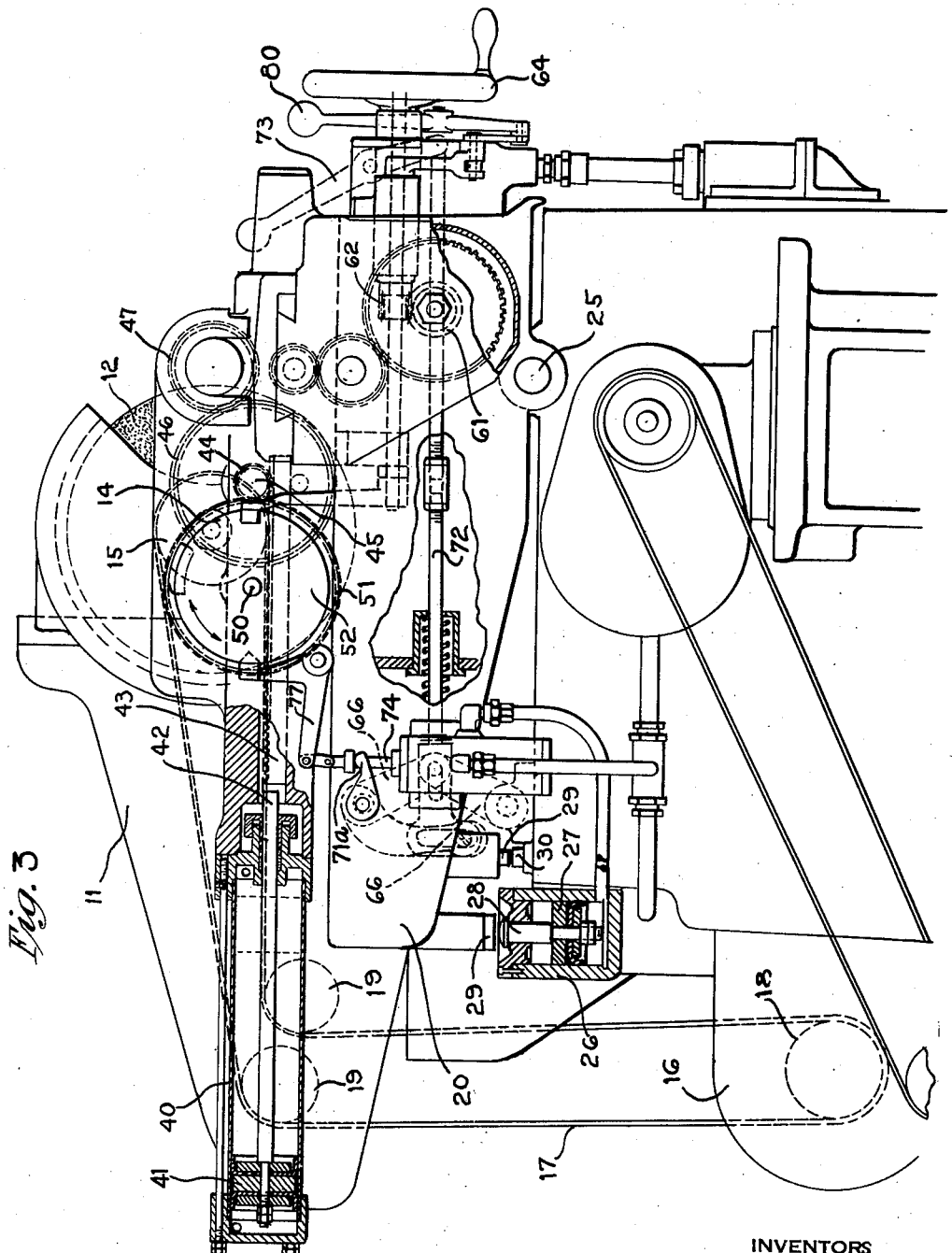

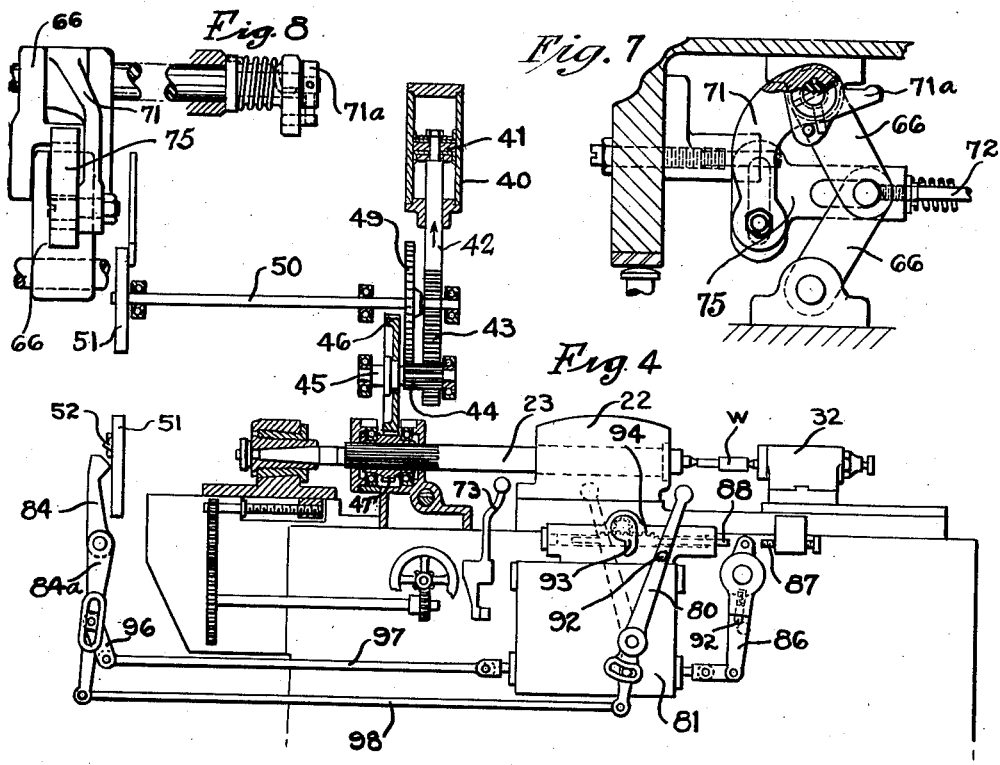

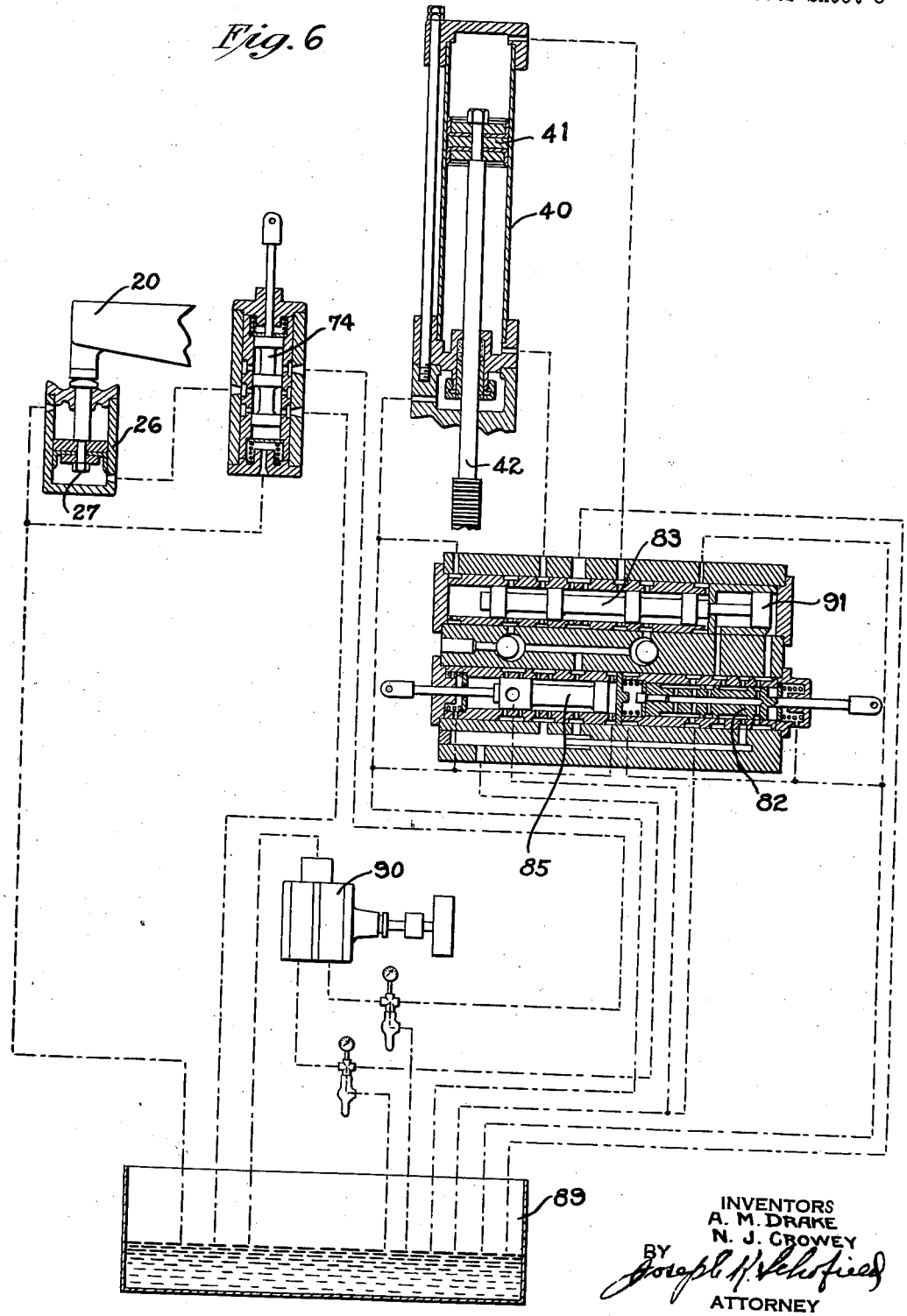

Patented Oct. 4, 1938

2,131,939

UNITED STATES PATENT OFFICE 2,131,939

PRODUCTION TAP GRINDER

Alden M. Drake and Norman J. Crowey, West Hartford, Conn., assignors to Niles-Bement-Pond Company, Hartford, Conn., a corporation of New Jersey Application August 1, 1936, Serial No. 93,856

7 Claims. (Cl. 51—95)

This invention relates to screw thread grinding machines and particularly to a high production tap grinding machine using a multiple grooved wheel.

An object of the present invention is to provide an efficient semi-automatic rapid production tap grinding machine in which an entire screw thread on a tap is finished in one or several complete rotations of the tap in contact with a wide grinding wheel having approximately as many grooves as there are teeth along the threaded portion of the tap.

Another object of the invention is to provide hydraulic means for simultaneously rotating and advancing the work upon its axis past the abrasive wheel in accordance with the lead of the tap being ground, there being also hydraulic means permitting advancement of the work toward the wheel at the beginning of the grinding operation and to positively oscillate the work away from the wheel when the grinding operation has been completed.

Another object of the invention is to provide adjustable cam means controlling the number of rotations given the work during the grinding operation and to provide controlling means for the hydraulic actuated members to operate them in accordance with a predetermined cycle and in timed relation to each other.

And finally it is an object of the invention to provide a starting lever by means of which an operator can start operation of the grinding cycle and to provide means which at the completion of the grinding operation will return this lever to its initial position so that the machine will stop the rotation and advancement of the work and withdraw the work from the wheel after a predetermined number of complete rotations of the work, the machine then being in position to remove the completed work and insert a new blank.

With the above and other objects in view our invention consists in the features of construction and operation set forth in the following specification and illustrated in the accompanying drawings.

In the accompanying drawings annexed hereto and forming a part of this specification, we have shown our invention embodied in a machine for making small and medium size taps but it will be understood that the invention can be otherwise embodied and that the drawings are not to be construed as defining or limiting the scope of the invention, the claims appended to this specification being relied upon for that purpose.

In the drawings:

Fig. 1 is a complete front elevation of the complete machine.

Fig. 1ª is a side elevation showing a portion of the controlling mechanism.

Fig. 2 is a front view of a part of the machine, parts being shown in section and on an enlarged scale.

Fig. 3 is an end elevation taken from the left of Fig. 1, parts being sectioned to more clearly show their construction.

Fig. 4 is a diagrammatic view of the operative parts of the machine, these parts being all shown in the same plane.

Fig. 5 is a side elevation of the operative parts of the machine shown in Fig. 4.

Fig. 6 is a diagram of the hydraulic system of the machine.

Fig. 7 is an enlarged view of a part of the mechanism shown in Fig. 5, and

Fig. 8 is a side elevation of a portion of the mechanism shown in Fig. 7.

In the accompanying drawings, we have shown but one embodiment of the invention which is now deemed preferable, but it is to be understood that changes and modifications may be made within the scope of the appended claims without departing from the spirit of the invention.

Briefly, and in its preferred aspect, our invention may include the following principal parts: First, an oscillatory supporting carriage for the work to be ground mounted for limited oscillation about a horizontal axis on a suitable base; second, a slidable work supporting table on the oscillatory supporting carriage; third, a work supporting and rotating spindle within said table; fourth, a leader on said spindle having a screw threaded portion engaging within a nut on the carriage to advance the spindle axially when rotated; fifth, a hydraulically operated piston movable within a cylinder fixed to said supporting carriage; sixth, gearing connecting the piston and spindle to rotate said spindle in opposite directions by movement of said piston back and forth within its cylinder; seventh, a hydraulically actuated piston, movement of which within a short vertical cylinder fixed to the bed oscillates the supporting carriage to move the work being ground toward and from the wheel; eighth, toggle linkage between the base and supporting carriage movable to a self-locking position when the carriage is moved to its loading or inoperative position; ninth, a controlling lever for releasing the toggle linkage and for effecting release of pressure within the vertical cylinder to permit movement of said carriage to its operative position; and tenth, an adjustable slide on the base on which is mounted an abrasive wheel angularly and linearly adjustable relative to the work supporting carriage and table.

This tap grinding machine is similar in some respects to the grinding machine shown and described in the copending application of Norman J. Crowey Serial No. 8,331, filed February 26, 1935.

Referring more in detail to the figures of the drawings, we provide a base 10 on which may be slidably mounted a wheel carrying slide 11 adjustable forwardly and rearwardly by any suitable manually controlled means on a portion of the base 10. As the form of wheel slide 11 and its adjusting means to position the abrasive wheel 12 for different sizes of taps or other threaded work piece W is or may be similar to what is shown and described in the above-referred to application, further description of these parts is not thought to be necessary. The wheel adjusting slide 11 is manually adjusted by hand wheel 9 to its operative position and during operation upon any one tap or other screw threaded work remains in fixed position.

On the forward vertical surface of this wheel slide 11 is mounted an angularly adjustable wheel head 13 in which is mounted a driving shaft 14 carrying a suitable abrasive wheel 12. It will be sufficient to state that the wheel 12 may have a plurality of annular grooves corresponding to the threads being ground both in spacing and angle of their sides. The head 13 also may be tilted to a position corresponding to the helix angle of the threads being ground by adjusting the head 13 to an oblique position. On this spindle or shaft 14 is provided a pulley 15 by means of which the wheel 12 may be rotated at a high rate of speed by a suitable motor 16 preferably mounted in rear of the base 10. In the drawings, in Fig. 3, there is shown a driving belt 17 connecting the driving pulley 15 on the wheel spindle 14 with a pulley 18 on the armature shaft of the motor 16, this belt 17 preferably may pass over the intermediate pulleys 19 adjustable to tighten the belt.

Mounted for oscillation on the base 10 upon a horizontal axis is a large and heavy carriage 20 on which is slidably mounted for longitudinal movement a table 21 supporting a slidable work supporting and rotating head 22. Within the head 22 is a work supporting spindle 23 on the outer end of which may be mounted in the usual manner a tap or other work piece W to be threaded. The direction of movement of this table 21 is horizontal and parallel to the spindle 23 so that the tap or other threaded member W being ground supported on the spindle 23 may be traversed axially past the abrasive wheel 12. The means mounting the spindle 23 for traversing and rotating the tap W will presently be described.

In order to support this carriage 20 for oscillation, a horizontal shaft 25 is provided in the base having direct engagement with suitable bearing surfaces upon the lower surfaces of the supporting carriage 20. Limited oscillatory movement only of this supporting carriage 20 is required sufficient to advance the member W being ground into and out of engagement with the abrasive surface of the wheel 12.

In order to effect the oscillatory movements of this carriage 20 there is provided a short cylinder 26 preferably mounted in fixed position in rear of the base 10 and having its axis disposed vertically. Within this cylinder 26 operates a piston 27, the piston rod 28 of which extends from the upper end of the cylinder and engages an abutment 29 formed on the lower surface of the supporting carriage 20. By admitting fluid to the lower end of the cylinder 26 below the piston 27 the piston rod 28 may be forced upward to oscillate the supporting carriage 20 in a direction to retract the tap W being ground away from the wheel 12. By allowing the fluid within the cylinder 26 to exhaust the carriage 20 will be oscillated by its own weight in a direction to advance the tap W into operative grinding position toward the grinding wheel 12. The controlling means for admitting fluid to and for exhausting fluid from the cylinder 26 during the cycle of operation of the machine will presently be described. To limit the position of the carriage 20 while the work W is in engagement with the wheel 12 an adjustable abutment 29 may be provided depending from the carriage 20 and engaging a fixed abutment 30 on the upper surface of the base 10.

The head or headstock 22 on the longitudinally slidable table 21 referred to above rotatably supports the work supporting and rotating spindle 23 having engaging means for the member being ground. This spindle 23 as shown in Fig. 2 is mounted rotatably upon suitable bearings, preferably anti-friction bearings 31, within the head 22. Also on this table 21 carrying the head 22 is provided a tailstock 32 by means of which the outer end of the tap or other work piece W may be properly supported in the usual manner.

The work supporting and rotating spindle 23 at its opposite end from that engaging the work piece W is provided with a threaded member 35 forming a leader. This leader 35 is removably mounted on the spindle 23 in alignment therewith and is directly engaged with a nut 36 fixed to a longitudinally movable slide 37 adjustable in the direction of the axis of the spindle 23 directly upon the supporting carriage 20 by suitable manual means which will be referred to hereafter. It will be seen from the above described mechanism that by rotating the spindle 23 the work piece W as well as the spindle 23 will be axially advanced past the wheel 12, the advancing movement being effected by and corresponding to the lead or pitch of the threaded leader 35. This movement of the spindle 23 also effects longitudinal movement of the table 21 on which the headstock 22 and tailstock 32 are mounted. As the width of the wheel 12 is or may be substantially equal to the length of the threaded portion of the tap or other work W being ground, the longitudinal movement of the table 21 and the parts carried thereby is relatively small. For convenience in operating upon threaded members having different leads, the leaders or threaded members 35 and the nuts 36 engaging them are adapted for ready removal and replacement of other leaders upon the spindle 23. As shown in Fig. 1, the nut 36 is conical on its outer surface and is fitted accurately and retained rigidly within the upper portion of the slide 37 supported on the carriage 20. The purpose of the adjustability of the slide 37 and the means therefor will presently be described.

In order to rotate the spindle 23, its leader 35 and the work W being ground during the grinding operation, there is provided an elongated cylinder 40 extending in a direction normal to the axis of the spindle 23. This cylinder 40 is mounted directly and in fixed position upon the upper surface of the supporting carriage 20. Within this cylinder 40 operates a piston 41, fluid being admitted at opposite ends of the cylinder 40 to effect reciprocatory movements of its piston 41. Extending from the forward end of the cylinder 40 and connected to the piston 41 is a piston rod 42 having an elongated rack 43 secured upon its forward and free end. This rack 43 engages a pinion 44 on a short horizontal intermediate shaft 45 rotatably mounted upon the carriage 20. On this shaft 45 also there is provided a large gear 46 meshing with a gear 47 rotatable within the fixed head on the carriage 20. This latter gear 47 directly engages a splined portion 48 of the work supporting and rotating spindle 23. Rotation of this gear 47, therefore, by the forward and return movements of the piston 41 and rack 43 and intermediate connections will rotate the spindle 23 several complete rotations depending upon the particular gear ratios between the rack 43 and the gear 47 and the length of movement of the rack 43.

Also in engagement with the pinion 44 engaging the rack 43 is a gear 49 on the inner end of a horizontal shaft 50. This shaft 50 is rotatably mounted in the supporting carriage 20 and on its outer end there is provided a cam controlling disc 51. This disc 51 may be provided with circular grooves in which may be adjustably fitted and secured a cam plate or dog 52, the position of which may be adjustable for the purpose of controlling the cycle of operations presently to be described.

In order to aline the tap W accurately with the grooves of the abrasive wheel 12 longitudinally of the tap, means are provided to manually adjust the longitudinal position of the nut 36 within which the leader 35 rotates. For this purpose the support carrying the leader nut 36 as stated above is in the form of a small slide 37 mounted for movement on the carriage 20 in a direction parallel to the axis of the spindle 23 and having a nut 55 depending from its lower surface. Engaging this nut 55 is a screw 56 rotatably mounted within the supporting carriage 20 and having a gear 57 on its opposite end. This latter gear meshes with an intermediate gear 58 which in turn meshes with a gear 59 on a shaft 60 extending longitudinally within carriage 20. In order to rotate this shaft 60 to position the leader nut 36 there is provided a worm wheel 61 thereon engaged by a worm 62 on the rear end of the forward extending shaft 63 rotatably mounted within carriage 22. The forward end of this shaft extends to the front of the machine and is provided with a hand wheel 64 so that the operator may, by simply rotating the hand wheel 64, adjust the axial position of the slide 37, the leader nut 36, the spindle 23 and work piece W being ground relatively to the convolutions of the wheel 12.

The supporting carriage 20 is oscillated in a direction to withdraw the work W away from the wheel 12 positively by admitting fluid under pressure to the lower end of cylinder 26. To retain the carriage 20 in its inoperative position holding the work W away from the wheel 12 when pressure of the fluid within cylinder 26 is released there is provided a toggle linkage. Links 66 attached together at one end have their opposite ends attached respectively to the base 10 and to the carriage 20. By oscillating the carriage 20 from the working position shown in Fig. 3 to the loading position the links 66 are brought to and slightly beyond a straight line position in which position the links 66 are limited from further movement and the carriage 20 will be retained in its loading position. To move the links 66 to again permit oscillatory movement of the carriage 20 into operative position there is provided a forwardly extending rod 72 attached to the links 66 as shown most clearly in Fig. 7 and extending to the forward face of the machine. A hand lever 73 pivotally mounted on the base 10 and attached at one end to the forward end of the rod 72 enables the links 66 to be moved out of alined position.

Movement of these links 66 also operates the valve controlling admission and exhausting of fluid to and from cylinder 26. When links 66 are moved to the position shown in Fig. 7, which permits downward movement of the rear portion of carriage 20, a lever 71 is oscillated. Movable by this lever 71 in one direction is a short arm 71ᵃ engaging an extended end of valve 74. By movement of the links 66 to permit the carriage 20 to oscillate into its operative position arm 71ᵃ is forced upward to raise the valve 74 in which position fluid is exhausted from below piston 27. From an inspection of Fig. 7 it will be seen that an elongated horizontal slot in the member 75 to which the rod 72 is attached first effects movement of the valve 74 upward to release fluid from below the piston 27 prior to movement of the rod 72 far enough to engage and oscillate the links 66.

To move the valve 74 downward to admit fluid to the cylinder 26 below piston 27 and thus oscillate carriage 20 to its inoperative position, one of the cam dogs 76 on cam disc 51 engages and oscillates lever 77. Lever 77 as shown in Fig. 5 is attached to valve 74 so that when engaged by cam 76 lever 77 moves valve 74 downward and oscillates carriage 20 to disengage the work W from wheel 12. By varying the position of the cam dog 76 the point in the stroke of piston 41 and rack 43 at which carriage 20 will be oscillated to its inoperative position may be widely varied. The number of turns of the work W may therefore be increased or decreased as required by the length of the threaded portion of the work W and the width of the wheel 12.

Hydraulic means are provided as indicated in the diagram, Fig. 6, not only for controlling the oscillatory movements of the supporting carriage 20 but also for controlling the rotation and axial movement of the work W in predetermined timed relation to each other. By means of a lever 80 pivotally supported in front of the machine the valve mechanism for the hydraulic system housed within casing 81 may be moved to first admit fluid under pressure to a pilot valve 82 which operates a controlling valve 83 to initiate movement of the rack 43 rearward to rotate and advance the work W. Simultaneously by oscillating lever 73 links 66 are released from their straight line position and fluid is released from the lower end of the vertical cylinder 26, thus allowing the supporting carriage 20 to advance the work W being ground directly toward the wheel 12. Fluid is continued to be admitted slowly to the forward end of the horizontal cylinder 40, thus moving the piston 41 and rack 43 toward the rear. This rotates the spindle 23 through the above described gearing and by means of the leader 35 advances the spindle 23 axially to grind the thread upon the work for a predetermined number of turns. Movement of rack 43 through the means above described also rotates the cam or timing disk 51. As soon as the piston 41 reaches a point in its motion toward the rear of the cylinder 40 as determined by the particular work being ground the dog 52 on the timing or controlling disk 51 actuates lever 84 which actuates valve 85 in the control box or valve chest 81 through arm 84ª pivoted thereto to stop admission of fluid to this rack operating cylinder 40 and simultaneously by means of cam dog 76 engaging lever 77 admits fluid to the lower end of the vertical cylinder 26 which forces its piston upward to oscillate the supporting carriage 20 about its axis and thus withdraw the work from the wheel 12.

It will be understood that several rotations of the work piece may take place while the rack 43 and its piston 41 move toward the rear so that the tap W may be ground by a number of different convolutions on the wheel. The number of rotations of the work is governed by the position of the timing dog or cam 52 on the disc 51 and the length of movement of the rack 43 that takes place before the cam oscillates the lever 84 to stop further rotation of the work by stopping the supply of fluid to the forward end of cylinder 40.

To return the rack 43 to its initial position to restore the table 21 and the work W for operation upon a new blank, pilot valve 82 is moved to its right hand position. In this position of the pilot valve the controlling or main valve 83 is moved toward the left. This supplies fluid to the rear of cylinder 40 and advances the piston 41 toward the front of the machine. For the purpose of moving pilot valve 82 to the right a lever 86 pivotally mounted on the carriage 20 is connected to the valve and its upper end engages an adjustable abutment 87 on the table 21. When abutment 87 strikes lever 86, which may take place at different positions of the table 21 as required by the work being ground, valve 82 is moved to the right. This engagement of abutment 87 is timed to take place promptly upon completion of the work and substantially simultaneously with oscillatory movement of the carriage 20 away from the work. The work W is therefore rotated in the reverse direction and the table 21 is returned to its initial position. Movement forward of rack 43 rotates cam disc 51 in a retrograde direction and upon its reaching its initial position cam dog 52 strikes lever 84 and moves valve 85 to the left or stop position. To return the valve 82 to its initial or left hand position to restore the position of main valve 83 a spring plunger 88 is provided so that when the table 21 has moved toward the right toward its starting position lever 86 may be forced to move valve 82 toward the left. Plunger 88 is moved in a direction to move valve 82 toward the left by movement of the starting lever 80 as will be presently described.

Within the valve casing 81 the three valves 82, 83 and 85 are separate and independently movable. These valves comprise main control valve 83, pilot valve 82 for moving the main valve 83, and stop and start valve 85. By reference to the diagram, Fig. 6, it will be seen that the main valve 83 has fluid connections to opposite ends of the cylinder 40 within which operates the work rotating and advancing piston 41. There is also a return connection for fluid from either end of the cylinder 40 through the main valve 83 back to the supply tank 89. To admit fluid to the main valve 83 for admission to the ends of cylinder there is provided the stop and start valve 85. This latter valve is actuated through control levers presently to be described to supply fluid from a pump or other source of supply 90. In the position shown the start and stop valve 85 is open and the main valve 83 is in its position for admitting fluid to the forward end of cylinder 40 during which the grinding operation takes place.

To stop further movement of the piston 41 the main valve 83 is moved to its opposite position by its pilot valve 82. Movement of this pilot valve 82 to the right is effected by engagement of lever 86 pivoted on the carriage 20 with a table dog 87 adjustable for different lengths of work. Fluid under pressure is constantly admitted to the chamber within which pilot valve 82 operates and in either position of this valve admits fluid under pressure to a small chamber within which a head 91 on one end of the main valve 83 operates. Movement of pilot valve 82 from one extreme position to the other admits fluid to one end and permits exhaust of fluid from the opposite end of this chamber.

The lever 86 operating the pilot valve 82 is provided with a spring detent 92 so that the pilot valve 82 is resiliently held in one extreme position or the other. To move pilot valve 82 to its left hand position shown in Fig. 6 to start rotation and advancing movement of the work W plunger 88 is provided engaging the left hand side of the upper end of this lever 86. This plunger 88 is normally spring pressed toward the left and is forced toward the right by movement of starting lever 80 in this direction to start operation of the machine. Starting lever 80 engages by means of an outstanding pin 92 with the lower end of a short arm 93, the shaft carrying this arm 93 having a pinion engaging a rack 94 formed on the plunger 93. Movement of the starting lever 80 to the right to start the machine therefore forces the upper end of plunger 88 to the right to oscillate pilot valve lever 86 and move the pilot valve 82 toward the left. Movement in the reverse direction of starting lever 80 is inoperative to move plunger 88 and passes the arm 93 which is free to rotate in a clockwise direction.

The stop and start valve 85 is moved to its left hand position stopping the supply of fluid under pressure to the main valve 83 by lever 84 oscillated by engagement with a cam dog or disk 51. Movement of this lever 84 by the cam dog 52 oscillates an arm 96 centrally pivoted to the carriage 20 and having its upper end engaging within an elongated slot in the cam operated lever 84. Movement, therefore, of the lever 84 in an anticlockwise direction forces rod 97 attached to the lower end of pivoted arm toward the left and moves the valve 85 in the same direction. Also this movement of the cam operated lever 84 moves a reach arm 98 attached at its lower end toward the right and forces the operating lever 80 to its stop position.

The operation of the machine through a cycle to completely grind a screw thread upon a tap W or other work piece is as follows: With a work piece W mounted in the usual manner upon the spindle 23 and tailstock center as shown in Fig. 2 the starting lever 80 is oscillated to its starting position toward the right and lever 73 is oscillated rearwardly. Movement of lever 80 moves valve 83 to move the piston 41 rearward and thus starts rotary and axial movements of the spindle 23 and the work piece W past the wheel 12. Movement of lever 73 opens the toggle joint 66 and releases fluid from within cylinder 26 to oscillate the carriage 20 so that the work piece is brought into contact with the wheel. Rotary and axial movements of the work piece W continue for several convolutions until cam disc 51 rotates to a position for its dog 52 to oscillate lever 84 to stop further operation by returning starting lever 80 to its off position. This returns valve 83 to its initial position and thus reverses the direction of motion of piston 41 to rotate and move the work piece W back to its initial position and simultaneously rotates the cam disk 51 back to its initial position. This movement of disk 52 brings dog 76 into contact with lever 77 which controls admission of liquid under pressure to cylinder 26 to cause oscillation of carriage 20 to move the work piece away from the wheel. Oscillation of lever 84 also returns the stop and start valve 85 to its stop position. The parts of the machine have now been returned to their initial or starting position so that the completed work piece may be removed and after inserting a new blank the machine may again be started upon its cycle of operation.

What we claim is:

1. A screw thread grinding machine comprising in combination, a base, an oscillatory support thereon, a work supporting table mounted for reciprocation on said support, a work rotating spindle in said table, an abrasive wheel having a plurality of annular grooves therein mounted adjustably on said base and in position to engage work mounted on said table, and hydraulically operated means for effecting oscillatory movements of said support to move the table toward and from the wheel and to effect simultaneous reciprocatory and rotary movements of said table and spindle respectively past the wheel, said movements being in timed relation to each other.

2. A screw thread grinding machine comprising in combination, a base, an oscillatory support thereon, a work supporting table mounted for reciprocation on said support, a work rotating spindle in said table, a threaded leader on said spindle, a nut on said table engaging said leader, a wheel head on said base adjustable toward and from said work table, an abrasive wheel mounted in said head, hydraulic means to simultaneously rotate said leader and spindle and reciprocate said table to advance a work piece on said spindle past the wheel, hydraulic means to oscillate said support in one direction, and means controlled by the hydraulic means for rotating said spindle to effect rotation and reciprocation of said spindle and oscillation of said support in predetermined timed relations to each other.

3. A screw thread grinding machine comprising in combination, a base, an oscillatory support thereon, a work supporting table mounted for reciprocation on said support, a work rotating spindle in said table, a threaded leader on said spindle, a nut housed in said table and engaging said leader, an abrasive wheel mounted adjustably on said base and in position to engage work mounted on said spindle, hydraulic means to oscillate said support, and hydraulic means to effect rotary and reciprocatory movements of said spindle to advance a work piece on said spindle past the wheel, said means controlled by the hydraulic means for rotating said spindle effecting said movements of said support and spindle in predetermined timed relations to each other.

4. A screw thread grinding machine comprising in combination, a base, an oscillatory support thereon, a work table mounted for reciprocation on said support, a work supporting spindle mounted in said work table, a leader on said spindle, a nut on said table engaging said leader, a gear splined to said spindle, a cylinder on said support having a piston therein, a rack extending from said piston and drivingly connected to said gear whereby movement of said piston will simultaneously rotate and reciproc te said spindle, a wheel head on said base having a work engaging abrasive wheel adjustable toward and from said work supporting table, a cylinder on said base having a piston therein, a piston rod on said piston engaging said support whereby movement of said piston within its cylinder oscillates said support to move the work table from said wheel, and means to effect movements of said pistons in timed relation to each other whereby a work piece may have a screw thread formed thereon.

5. A screw thread grinding machine comprising in combination, a base, an oscillatory support thereon, a work table mounted for reciprocation on said support, a work supporting spindle mounted in said work table, a leader on said spindle, a nut on said table engaging said leader, a gear splined to said spindle, a cylinder on said support having a piston therein, a rack extending from said piston and drivingly connected to said gear whereby movement of said piston will simultaneously rotate and reciprocate said spindle in accordance with the screw threads on said leaders, a wheel head on said base having a work engaging abrasive wheel adjustable toward and from said work supporting table, a cylinder on said base having a piston therein, a piston rod on said piston engaging said support whereby movement of said piston within its cylinder may oscillate said table toward and from said wheel, a disc rotated by movement of said first piston, cams thereon, and valves operated by said cams whereby said pistons are operated in predetermined timed relation to each other whereby a work piece may have a screw thread formed thereon.

6. A screw thread grinding machine comprising in combination, a base, an oscillatory support thereon, a work supporting table mounted for reciprocation on said support, an abrasive wheel mounted adjustably on said base and in position to engage work mounted on said table, hydraulically operated means for effecting oscillatory movements of said support to move work mounted on said table toward and from said wheel, and toggle linkage operating with movements of said support, whereby said support may be retained in one position by said linkage upon failure of pressure in said hydraulic means.

7. A screw thread grinding machine comprising in combination, a base, an oscillatory support thereon, a work supporting table mounted for reciprocation on said support, an abrasive wheel mounted adjustably on said base and in position to engage work mounted on said table, hydraulically operated means for effecting oscillatory movements of said support to move work mounted on said table toward and from said wheel, toggle linkage operating with movements of said support, whereby said support may be retained in one position by said linkage upon failure of pressure in said hydraulic means, and a lever for controlling the release of fluid in said hydraulic means to permit movement of said support to its opposite position, said lever also operating said linkage.

ALDEN M. DRAKE.
NORMAN J. CROWEY.